(12) United States Patent
Willson

(10) Patent No.: US 9,811,864 B1
(45) Date of Patent: Nov. 7, 2017

(54) AUTOMATIC INVOICING BASED ON BUSINESS ACTIVITY

(71) Applicant: Michael Rea Willson, Sunnyvale, CA (US)

(72) Inventor: Michael Rea Willson, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 830 days.

(21) Appl. No.: 14/015,680

(22) Filed: Aug. 30, 2013

(51) Int. Cl.
*G06Q 40/00* (2012.01)

(52) U.S. Cl.
CPC .................................. *G06Q 40/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,292,789 B1* | 9/2001 | Schutzer | ............... | G06Q 20/04 705/34 |
| 8,060,394 B2* | 11/2011 | Woodings | .............. | G06Q 10/06 705/7.13 |
| 8,918,898 B2* | 12/2014 | Nielsen | .................... | G08B 5/22 726/27 |
| 9,300,646 B1* | 3/2016 | Saylor | .................... | H04L 63/08 |
| 2012/0143733 A1* | 6/2012 | Kappauf | ......................... | 705/32 |
| 2015/0046206 A1* | 2/2015 | Kelley | ......................... | 705/7.13 |

* cited by examiner

*Primary Examiner* — Luna Champagne
(74) *Attorney, Agent, or Firm* — Osha Liang LLP

(57) ABSTRACT

A method for generating a service provider invoice includes obtaining documents from a plurality of sources via a service provider mobile device of a service provider. The documents are generated for customer jobs performed by the service provider at jobsites. Based on a pre-determined criterion, the documents are analyzed to identify a subset of the documents corresponding to a jobsite. The job data is extracted from the subset of the documents, and used to generate the service provider invoice. The job data includes time and material information associated with a customer job of the customer jobs that is performed at the jobsite.

15 Claims, 8 Drawing Sheets

AUTOMATIC INVOICING BASED ON BUSINESS ACTIVITY

BACKGROUND

Many service-based service providers spend time away from the office and out in the field. For example, roofers, landscapers, and/or other types of workers generally spend most of their time working at residential houses or other business premises. When the roofer, landscaper, and/or other type of worker return to their office, they remember the amount of time and other information about the job and create an invoice to send to the customer.

SUMMARY

In general, in one aspect, embodiments of the invention relate to a method for generating a service provider invoice that includes obtaining documents from a plurality of sources via a service provider mobile device of a service provider. The documents are generated for customer jobs performed by the service provider at jobsites. Based on a pre-determined criterion, the documents are analyzed to identify a subset of the documents corresponding to a jobsite. The job data is extracted from the subset of the documents, and used to generate the service provider invoice. The job data includes time and material information associated with a customer job of the customer jobs that is performed at the jobsite.

In general, in one aspect, embodiments relate to a system for generating a service provider invoice. The system includes a service provider mobile device used by a service provider, at least one computer processor, and memory storing instructions executable by the at least one computer processor. The instructions include functionality for a job data collector, a job data analyzer, and a service provider invoice generator. The job data collector is configured to obtain documents from sources via the service provider mobile device. The documents are generated for customer jobs performed by the service provider at jobsites. The job data analyzer is configured to analyze, based on a pre-determined criterion, the documents to identify a subset of the documents corresponding to a jobsite of the jobsites, and extract job data from the subset of the documents. The job data includes time and material information associated with a customer job that is performed at the jobsite. The service provider invoice generator is configured to generate the service provider invoice using the job data. The system further includes a repository for storing the documents, the job data, and the service provider invoice.

In general, in one aspect, embodiments relate to a non-transitory computer readable storage medium that include software instructions for generating a service provider invoice, that when executed, include functionality for obtaining documents from sources via a service provider mobile device of a service provider, analyzing, based on a pre-determined criterion, the documents to identify a subset of the documents corresponding to a jobsite, extracting job data from the subset of the documents, and generating the service provider invoice using the job data. The documents are generated for customer jobs performed by the service provider at the jobsites. The job data include time and material information associated with a customer job.

Other aspects of the invention will be apparent from the following description and the appended claims.

DETAILED DESCRIPTION

Figure 1:
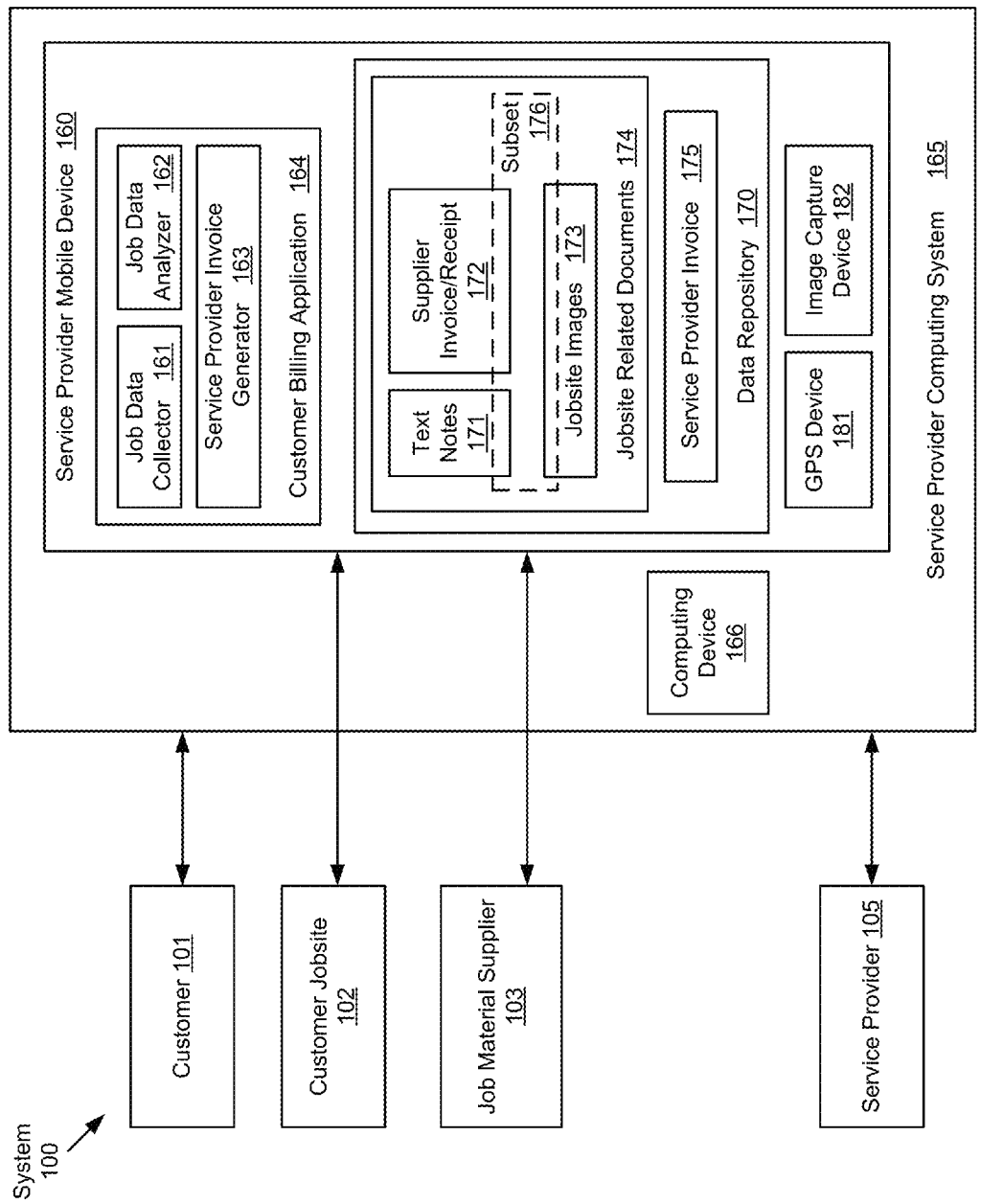
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to automatically generate service provider invoices for a service provider who provides services at various jobsites in the field. Specifically, in one or more embodiments of the invention, while a service provider is providing the service, the service provider may generate one or more documents having job data about the service. Later, the documents are analyzed and job data is extracted. Using the extracted job data, embodiments of the invention generate the service provider invoice. The service provider invoice may be transmitted to the customer without further intervention of the service provider or transmitted after the service provider has reviewed the invoice in accordance with one or more embodiments of the invention. By way of an example, the services may be performing construction, repair, landscape installation, or any other types of projects.

In one or more embodiments of the invention, an individual or organizational entity, such as customer, service provider, vendor, or other entity performs an action when an action is performed on behalf of the entity. For example, a service provider may be deemed to gather documents when an employee or agent of the service provider gathers documents. By way of another example, a service provider invoice is transmitted to the customer when the service provider invoice is transmitted to an agent or benefactor who pays the service provider invoice for the customer. In one or more embodiments, other type of billing, different from the service provider invoice, may also be automatically generated and transmitted to the customer.

FIG. 1 shows a block diagram of a system (100) for automatic invoicing based on business activities in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a service provider computing system (165) used by a service provider (105) who performs customer jobs for customers (e.g., customer (101)). A service provider (105) is an individual, group of individuals, organization entity, and/or business entity that provides services to a customer (105). A customer (101) is an individual, group of individuals, organization entity, and/or business entity that receives the service. For example, the service provider (105) may be a small business owner (SBO) who provides time and material based services one or more customers (e.g., customer (101)). In particular, the time and material based service(s) are performed at customer jobsites (e.g., the customer jobsite (102) of the customer (101)) and may include construction (e.g., building construction, road construction, home construction, and/or other construction), installation (e.g., electrical installation, network connectivity installation, office space installation, and/or other installation) repair (e.g., plumbing repair, electrical repair, appliance repair, automobile repair, and/or other repair), landscape installation (e.g., home landscape installation, nature trail installation, office space landscape installation), jobsite testing (e.g., concrete testing, code compliance inspection, and/or other testing) or other types of jobsite activities, or combinations thereof. In some embodiments and in some circumstances, the customer jobs may require materials purchased at material suppliers, such as the job material supplier (103). The job material supplier (103) is an individual, group of individuals, organization entity, and/or business entity that provides physical materials and/or services to the service provider to perform the job.

Although FIG. 1 shows a single customer (101) and single customer jobsite (102), the service provider (105) may have multiple customers with multiple customer jobsites. For example, at any moment in time, the service provider may have one, five, twenty, hundreds of customers, each with one or more corresponding customer jobsites. The service provider may contemporaneously and/or simultaneously provide the service to the multiple customers and/or the services may be temporally separated. Similarly, although FIG. 1 shows a single job material supplier (103), the service provider may have multiple job material suppliers.

Continuing with the service provider computing system (165), in one or more embodiments of the invention, the service provider computing system (165) includes a service provider mobile device (160) and optional computing device(s), such as the computing device (166). For example, the service provider mobile device (160) may be a smart phone, a tablet computer, or other type of mobile computing device. In one or more embodiments, the service provider mobile device (160) may be optionally supplemented by the computing device (166). The computing device (166) may include an office computer communicatively coupled, directly or indirectly and at least at one point in time, to the service provider mobile device (160). The computing device (166) may include a server or other cloud resource accessible by the service provider (105) via a network, such as the Internet. The service provider mobile device (160) and/or computing device (166) may correspond to the computing device discussed below with reference to FIG. 4.

Continuing with FIG. 1, as shown in FIG. 1, the service provider mobile device (160) includes a customer billing application (164), a data repository (170), a global positioning service (GPS) device (181), and an image capture device (182). In one or more embodiments, a portion of the customer billing application (164) and/or the data repository (170) may reside on the computing device (166). For example, a front-end client portion (e.g., the job data collector (161)) and a back-end server portion (e.g., the job data analyzer (162) and/or service provider invoice generator (163)) of the customer billing application (164) may reside separately on the service provider mobile device (160) and the computing device (166), respectively.

In one or more embodiments, the data repository (170) may be any data store (e.g., a flat file, hierarchical file, relational database, object-oriented database, etc.) capable of storing data collected, generated, used or otherwise accessed by the customer billing application (164). The data repository (170) may include a disk drive storage device, a semiconductor storage device, other suitable computer data storage device, or combinations thereof. For example, as shown in FIG. 1, the data repository (170) stores the jobsite related documents (174) and the service provider invoice (175).

In one or more embodiments of the invention, the jobsite related documents (174) are documents associated with one or more customer jobs (e.g., performed at the customer jobsite (102)). In particular, a portion (e.g., subset (176)) of the jobsite related documents (174) is used for generating the service provider invoice (175).

In one or more embodiments, the jobsite related documents (174) include the text notes (171). A text note is a textual based document that is generated by the service provider (105) to describe at least a portion of the customer job(s). For example, the text notes (171) may include a text based reminder message created by the service provider (105) regarding activities at the customer jobsite (102).

In one or more embodiments, the jobsite related documents (174) include the supplier invoice/receipt (172) captured by the service provider (105) that are related to the customer job(s). In one or more embodiments of the invention, the supplier invoice/receipt (172) is an invoice or receipt that is generated by job material supplier (103). The supplier invoice/receipt (172) may be a captured image (e.g., picture or scanned image) of the invoice/receipt, an electronic invoice/receipt, or other form of the invoice/receipt. For example, the supplier invoice/receipt images (172) may include an image of an invoice or a receipt related to purchasing materials to be used at the customer jobsite (102). Note that the supplier invoice/receipt (172) is different than the service provider invoice (175) generated by the service provider (105) for billing the customer (101).

In one or more embodiments of the invention, the jobsite images (173) are pictures of the jobsite (102). For example, the jobsite images may be camera captured images of various aspects of the jobsite, such as an image of area that needed repair, or caused additional time and/or expense, abnormal or extra features that were added by the service provider, or other image taken at the jobsite (102) or at another location for installation at the jobsite (102).

Thus, the text notes (171) may include a text based reminder message created by the service provider (105), the invoice/receipt images (172) may include a picture or scanned copy of an invoice and/or receipt for purchasing material(s) to be used at the customer jobsite (102), and the jobsite images (173), which may include a picture of the customer jobsite (102), are recordings of customer job progress and any added time and/or expense for the customer jobsite (102).

In one or more embodiments, the jobsite related documents (174) may also include other types of media, such as movies of the jobsite (102) that are taken by the service provider (105), and/or audio recordings taken by the service provider (102) at the jobsite (102). Both types of recordings may be later translated using a speech to text processor to generate text notes (171).

Continuing with the data repository (170), the service provider invoice (175) is a billing invoice for payment by the customer (e.g., customer (101)) for the customer job performed by the service provider (105). The service provider invoice (175) may be a request for payment for performance of the service provided by the service provider (105) to the customer (101). The service provider invoice (175) may include a detailed list of items (e.g., materials and services provided) with a price associated with each item. The service provider invoice (175) may also include identification of the customer (101), the service provider (105), the customer jobsite (102), accepted forms of payment, and other items.

Continuing with the service provider mobile device (160), in one or more embodiments, the image capture device (182) is a hardware device that includes functionality to capture an image. For example, the image capture device (182) may include a camera, a scanner, or other device capable of capturing the invoice/receipt images (172) and the jobsite images (173). In one or more embodiments, the global positioning service (GPS) device (181) is configured to obtain, automatically or in response to user input(s), a geographical location of the service provider mobile device (160). In one or more embodiments, the geographical location of the service provider mobile device (160) is used to identify where the service provider (105) is when performing various customer jobs.

Further as shown in FIG. 1, the customer billing application (164) is a software application with the functionality to automatically generate service providers (e.g., the service provider invoice (175)) for the service provider (105). In one or more embodiments of the invention, the customer billing application (164) includes a job data collector (161) that is configured to obtain the jobsite related documents (174) from various sources. For example, job data collector (161) may include a user interface that connects to a textual and/or speaker user interface (e.g., a keyboard, touch pad, microphone, etc.) for receiving the text notes (171) of the service provider mobile device (160). Further, job data collector (161) may include a software interface to the image capture device (182) to obtain images periodically in response to request(s) from the service provider (105). Similarly, the job data collector (161) may include functionality to connect to a cloud data repository (e.g., email server, financial application server, or other server) (not shown) and obtain the jobsite related documents (174). The job data collector (161) may include an application programming interface to obtain jobsite related documents (174) from other software on the service provider computing system (165). Additional details of obtaining the jobsite related documents (174) are described in reference to the flowcharts and the example depicted in FIGS. 2-3H below. Further, the above description of the job data collector (161) is only an example set of components and functionality included with the job data collector (161) may include alternative or additional components and/or functionality without departing from the scope of the invention.

In one or more embodiments of the invention, the customer billing application (164) includes a job data analyzer (162) that is configured to group portions of the jobsite related documents (174) into separate subsets (e.g., subset (176)) corresponding to different jobsites and to extract relevant information (referred to as job data) from each subset in preparation for generating invoices associated with the corresponding jobsites. In one or more embodiments, the jobsite related documents (174) are analyzed based on a pre-determined criterion to identify the subset (176) as associated with the customer jobsite (102) from all jobsites where the service provider (105) is working. For example, the pre-determined criterion for grouping may include the jobsite address, GPS data, customer name, timestamp, or other relevant information extracted from the jobsite related documents (174) that are matched to the customer jobsite (102).

Further, in one or more embodiments of the invention, the job data analyzer (162) includes functionality to extract relevant information that relates to billing the customer (101) for the customer job performed at the customer jobsite (102). Relevant information is any information that demonstrates a material or time expense of the service provider for the customer jobsite (102). In other words, relevant information is information that provides evidence supporting the service provider invoice. Such relevant information is referred to as job data and may include time worked, material used, and other job progress information associated with the customer job that is performed at the customer jobsite (102).

Additionally or alternatively, the job data analyzer (162) includes functionality to analyze the subset (176) of the jobsite related documents (174) to identify the customer (101) and to detect that a service provider (e.g., service provider invoice (175)) is due to be generated and sent to the customer (101), such as based on an invoicing schedule included in a pre-established customer job agreement between the service provider (105) and the customer (101).

Additional details of grouping the subset (176) and extracting job data therefrom to prepare the service provider invoice (175) for billing the customer (101) are described in reference to the method flowchart and the example depicted in FIGS. 2-3H below.

In one or more embodiments of the invention, the job data analyzer (162) is operatively connected to a service provider invoice generator (163) that is configured to generate the service provider invoice (175) using the job data extracted from the subset (176). The service provider invoice generator (163) includes functionality to display, receive approval, receive corrections, transmit the service provider invoice (175), or perform other actions or combinations thereof. The service provider invoice generator (163) may further include functionality to learn from approved invoices and corrections. For example, the service provider invoice generator (163) may include functionality to display the service provider invoice (175) as an invoice suggestion for billing the customer (101) in accordance with one or more embodiments of the invention. In one or more embodiments, in response to the service provider (105) reviewing the invoice suggestion, the service provider invoice generator (163) receives a service provider correction from the service provider (105) to revise the service provider mobile device (160). In one or more embodiments, the service provider invoice generator (163) may be trained during the training phase based on the service provider correction using a machine learning algorithm. For example, the service provider invoice generator (163) uses the machine learning algorithm to adjust an initial invoice generation criterion to generate an adaptively determined invoice generation criterion for use after the training phase is completed.

Additional details of generating invoice suggestions and learning the adaptively determined invoice generation criterion using the machine learning algorithm are described in reference to the method flowchart and the example depicted in FIGS. 2-3H below.

Figure 2:
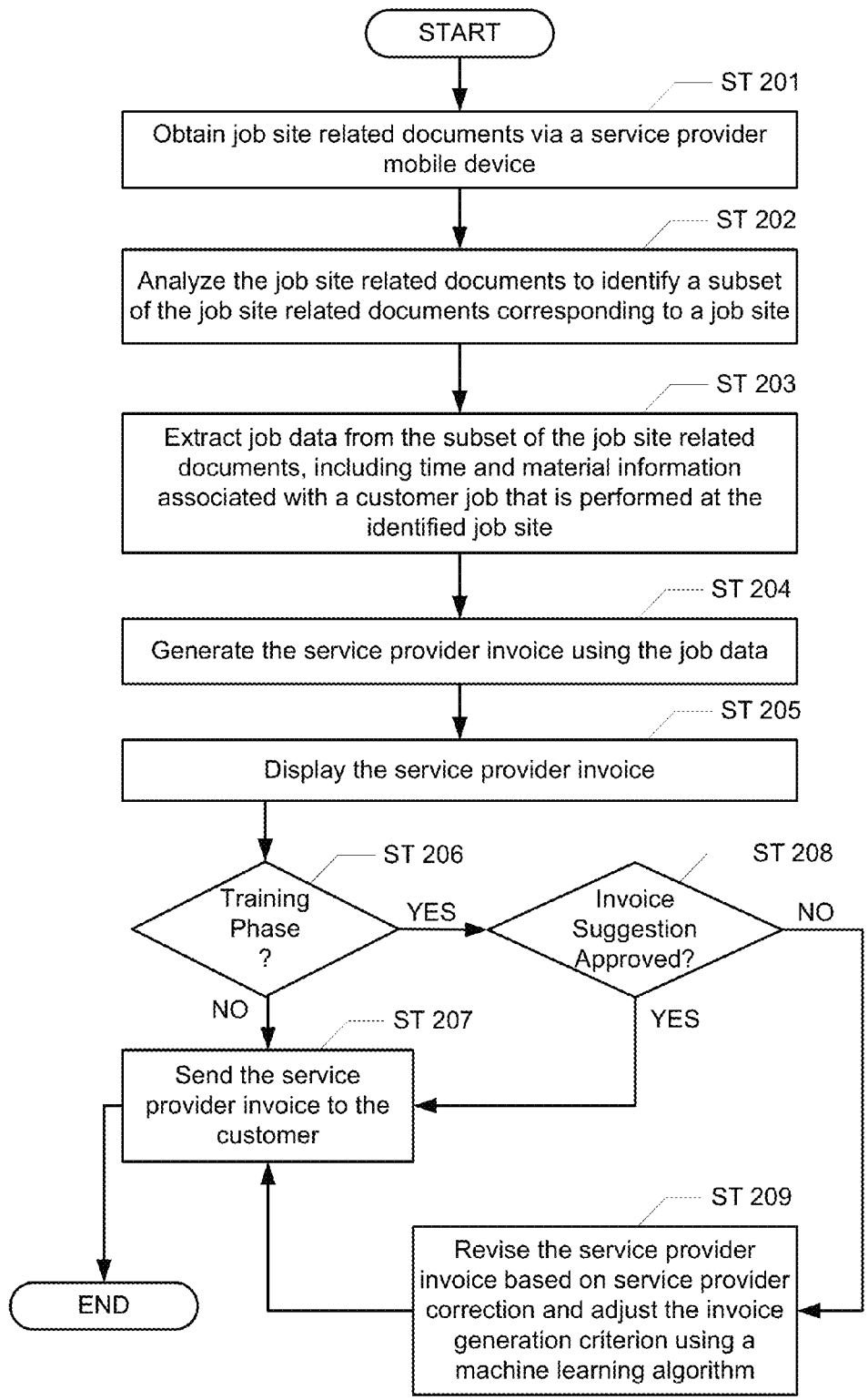
FIG. 2 shows a flowchart in accordance with one or more embodiments of the invention.

FIG. 2 shows a flowchart for automatic invoicing based on business activities in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG.

2. Accordingly, the specific arrangement of steps shown in FIG. 2 should not be construed as limiting the scope of the invention.

In Step 201, jobsite related documents are obtained from multiple sources via a service provider mobile device of a service provider. In one or more embodiments, the jobsite related documents are generated for customer jobs performed by the service provider at corresponding customer jobsites. For example, the jobsite related documents may include a text note generated by the service provider, such as periodic project description/updates related to a customer jobsite. In another example, the jobsite related documents may also include an image of a job material purchase record (e.g., receipt, invoice, etc.), where the receipt/invoice identifies an expense amount for purchasing an item by the service provider for use at a customer jobsite. In addition, the receipt/invoice may also identify other related information, such as purchased item type, quantity, cost per unit, etc. Similarly, the image may also be that of the customer jobsite to record periodic customer job progress at the customer jobsite. In one or more embodiments, the text note is entered by the service provider using a textual and/or audio user interface of the service provider mobile device, such as a keyboard, touch pad, microphone, etc. In one or more embodiments, the image is captured by the service provider using an image capture module of the service provider mobile device, such as a camera or scanner. In particular, while the service provider is performing the service for one or more customer jobsites, the service provider may capture jobsite related documents for the jobsites. The obtaining of jobsite related documents may be ongoing and gathered based on convenience. For example, if the service provider is billing the customer based on time and costs, the service provider may create a text note having the current time when the service provider enters the customer jobsite, the service provider may photograph a defect in construction and the resulting repair work that was performed immediately prior to covering the defect and repair work with drywall, and the service provider may create or update the text note when the service provider leaves the customer jobsite. The service provider may continually perform such actions with each customer and each customer jobsite. In one or more embodiments of the invention, while the jobsite related documents are obtained, metadata may be stored with the jobsite related documents. For example, the metadata may include GPS coordinates where the jobsite related document is gathered, timestamp identifying when the jobsite related document is gathered, and/or other information.

In Step 202, the jobsite related documents are analyzed based on a pre-determined criterion to identify a subset of the jobsite related documents corresponding to a customer jobsite. For example, the service provider may select the customer jobsite from a list of customer jobsites to request generation of a service provider invoice. By way of another example, the customer billing application may identify, based on a predefined agreement or a standard fee schedule, which the service provider invoice is due to be generated for the customer job site. In such an example, the customer billing application may have one or more triggers for the customer, such as time based trigger, new jobsite related document triggers, or other triggers, or may periodically check which customers are due an invoice. By way of another example, the jobsite related documents may be analyzed to determine whether an invoice is due. For example, a subset of the jobsite related documents, and identified as having a service provider invoice due to be generated for sending to a customer according to a previously established customer job agreement (e.g. a customer approved bid or job proposal) between the service provider and the customer. In the example, a customer job progress status (e.g., percentage job completion, a number of hours worked, an amount of material expense incurred, etc.) may be found by analyzing a text note in the particular subset. If the customer job progress status matches a billing milestone specified in the pre-established customer job agreement, then an invoice is determined as needing to be generated. In other words, the particular subset of the jobsite related documents is analyzed in view of the pre-established customer job agreement to detect when a service provider invoice is due to be generated and sent to the customer.

In one or more embodiments, the jobsite related documents are analyzed to obtain the subset corresponding to the customer jobsite. The analysis may be performed using the customer jobsite address, GPS data, customer name, timestamp, or other relevant information extracted from the jobsite related documents to group portions thereof into subsets of the jobsite related documents. For example, the particular one customer jobsite may match the customer jobsite address, GPS data, customer name, timestamp, etc. found in the corresponding subset of the jobsite related documents.

In one or more embodiments, analyzing the jobsite related documents includes retrieving GPS data items associated therewith and determining, based on the retrieved GPS data items, that a subset of the jobsite related documents are related to the particular one customer jobsite. For example, the text notes entered and/or images captured by the service provider working at the customer jobsite may be associated with the GPS coordinates captured by a GPS module of the service provider mobile device.

In one or more embodiments, analyzing the jobsite related documents includes analyzing extracted information from a receipt/invoice image and text note project description to determine that an item listed on the receipt/invoice is purchased for use at the particular one customer jobsite. For example, the text note project description may be analyzed to identify a type of the customer job. In addition, the receipt/invoice image may be analyzed to identify an item description of the listed item. Accordingly, the type of the customer job and the item description of the listed are compared to identify a match based on a pre-determined jobsite material list of the particular one customer jobsite. The item listed on the receipt/invoice is therefore determined as purchased for use at the particular customer jobsite based at least on the match. As a result, the text note and the receipt/invoice image are further confirmed as belonging to the same subset of the jobsite related documents.

In one or more embodiments, analyzing the jobsite related documents includes retrieving a timestamp of a text note to identify when the text note is generated by the service provider. In addition, a receipt/invoice image is analyzed to extract a purchase date when a listed item is purchased by the service provider. Accordingly, the purchase date and the timestamp are compared based on a pre-determined time range to identify a match. The pre-determined time range may be the date(s) and/or time(s) in which the service provider is identified as having worked for the customer jobsite. The item listed on the receipt/invoice is therefore determined as purchased for use at the particular customer jobsite based on the match. As a result, the text note and the receipt/invoice image are further confirmed as belonging to the same subset of the jobsite related documents.

In Step 203, job data is extracted from a subset of the jobsite related documents that is associated with the particular one customer jobsite. In one or more embodiments, the job data includes time worked, material used, customer related information, and job progress information associated with the customer job that is performed at the particular one customer jobsite. Identifying time worked may include extracting timestamps from text notes and other jobsite related documents. The elapse time between the start time and an end time for the time stamps are extracted. If supplier receipts and/or invoices are in image format, optical character recognition may be performed on the supplier receipts and/or invoices to transform the supplier receipts and/or invoices into textual format. Job data may be extracted from the textual format supplier receipts and/or invoices by obtaining an item description and an amount on the same line as the item description for each item listed on the textual format supplier receipts and/or invoices. Additionally or alternatively, a total and/or supplier name may be extracted from the textual supplier receipt/invoice.

Accordingly, the job data is used to generate a service provider invoice in Step 204 in one or more embodiments of the invention. For example, the material expense amount is extracted from the receipt/invoice image, based on which a total invoice amount is calculated. In yet another example, an elapse time amount is determined based on timestamps of the text notes. The timestamps identify when the text notes were generated by the service provider when working for the customer at the particular customer jobsite. Accordingly, a labor cost is calculated based on the elapse time amount and a stored labor rate of the service provider. The calculated labor cost is then included in the total invoice amount. The various extracted job data may be added as line items to the service provider invoice. For example, labor cost may be added as a separate labor line item in the invoice. Similarly, costs from supplier receipts and invoices may be added as one or more line items to the invoice. The various amounts (e.g., labor costs, supplier costs) may be totaled to obtain a total amount for the invoice. Each line item and total may be inserted into fields of a template for the invoice along with the service provider information, payment option information, and customer information. Further, applicable taxes may be automatically determined based on jobsite location or by a tax rate previously configured by the service provider. In addition, the invoice may also include discounts, or customer credits from past work with the customer that can be carried forward and automatically applied to the invoice.

In Step 205, the service provider invoice is displayed and presented to the service provider. In one or more embodiments, the service provider invoice is presented as an invoice suggestion during a training phase. In one or more embodiments, the service provider invoice is presented in response to a request from the service provider. For example, displaying the service provider invoice may be optional after the training phase.

In Step 206, a determination is made as to whether the service provider invoice is being generated during the training phase. In one or more embodiments, the training phase is set as a default condition that is disabled based on an explicit input of the service provider described below. In one or more embodiments, the determination made in Step 206 includes checking whether there is a pending input from the service provider to disable the training phase. Accordingly, the determination of Step 206 is made after any such pending input is processed.

If the determination of Step 206 is negative, i.e., the service provider invoice is not generated during the training phase (e.g., the training phase has been disabled), the flow may proceed to Step 207 where the service provider invoice is automatically sent to the customer. In one or more embodiments, displaying the service provider invoice is skipped after the training phase and the service provider invoice is automatically sent to the customer without reviewing or approval by the service provider. In such embodiments, Steps 205 and 206 may be performed in a reversed order opposite to what is shown in FIG. 2. Once the service provider invoice is sent to the customer in Step 207, the flow returns to Step 201 to continuously collect jobsite related documents and detect any service provider invoice coming due.

If the determination of Step 206 is positive, i.e., the service provider invoice is generated during the training phase, the flow proceeds to Step 208 where another determination is made as to whether the service provider invoice displayed as the invoice suggestion is approved by the service provider or not. Once again, if the determination is positive, i.e., the service provider has approved the invoice suggestion, the flow proceeds to Step 207 where the service provider invoice is sent to the customer. On the contrary, if the determination is negative, i.e., the service provider does not approve the invoice suggestion, the flow proceeds to Step 209 where the service provider invoice is revised based on a correction specified by the service provider. Accordingly, the flow further proceeds to Step 207 where the service provider invoice, as revised, is sent to the customer.

In one or more embodiments, in Step 209, a machine learning algorithm is used to learn how the service provider corrects the automatically generated service provider invoices during the training phase. For example, an initial invoice generation criterion used in Step 204 may be adjusted using the machine learning algorithm in an attempt to adjust the automatically generated service provider invoice to match the revision based on the service provider correction. After sufficient number of iterations through Steps 208, 209, and 207, the service provider may find that more corrections are not necessary and therefore disables the training phase from that time onward.

In one or more embodiments of the invention, after the service provider invoice is revised, the revised service provider invoice is sent to the customer in Step 207. Although not shown in FIG. 2, if more work exists on the job or on other jobs, the method may continue with Step 201 to create new invoices as desired.

Examples of using the machine learning algorithm to improve the accuracy of the automatically generated service provider invoice are described in reference to FIGS. 3A, 3B, 3C, 3D, 3E, 3F, 3G, and 3H below.

FIGS. 3A, 3B, 3C, 3D, 3E, 3F, 3G, and 3H show an example of automatic invoicing based on business activities in accordance with one or more embodiments of the invention. Although FIGS. 3A, 3B, 3C, 3D, 3E, 3F, 3G, and 3H show implementation examples of embodiments of the invention, those skilled in the art will appreciate that there may be other ways in which to implement embodiments of the invention, and that the example descriptions are not meant to limit the scope of the invention.

Figure 3A:
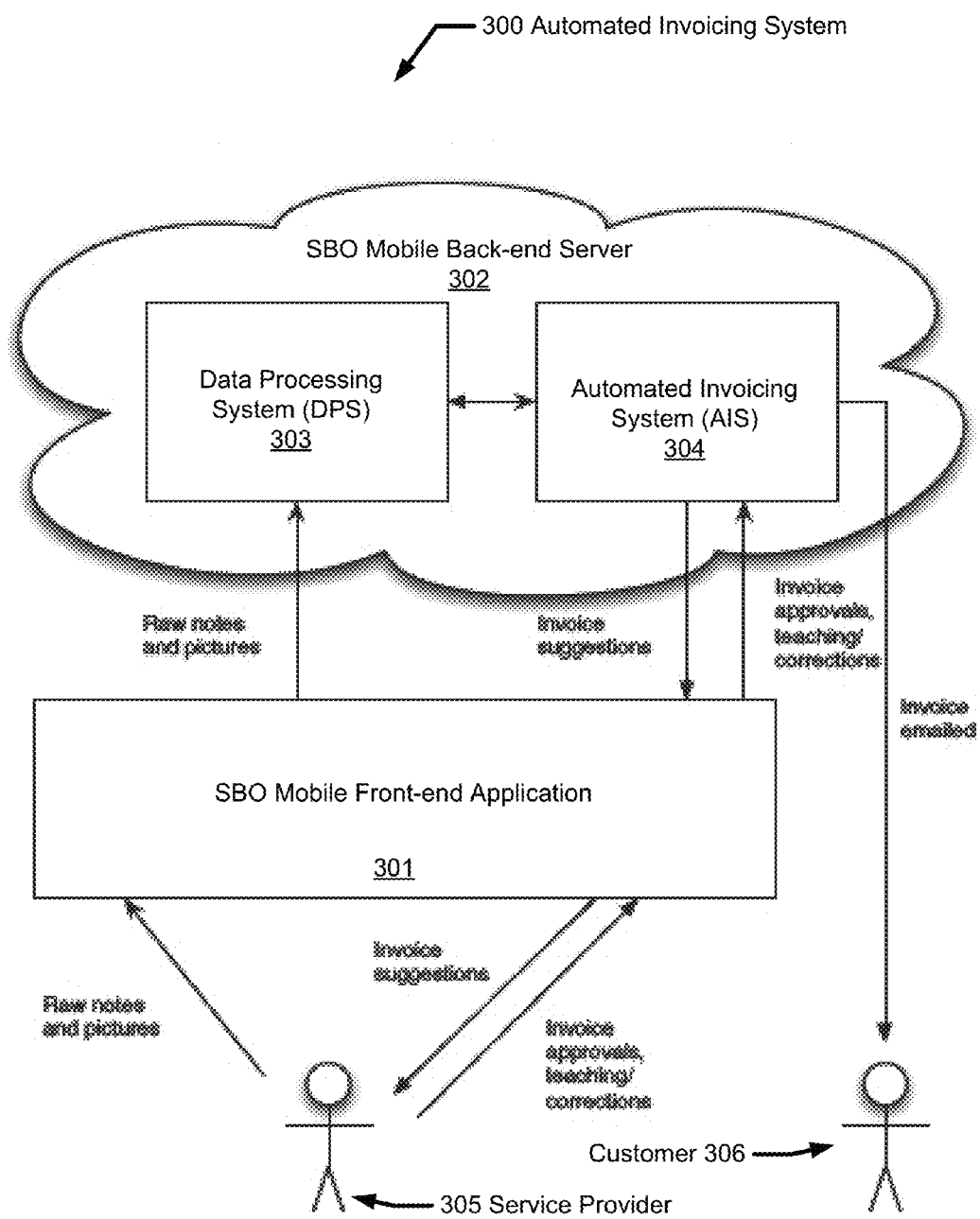
FIGS. 3A, 3B, 3C, 3D, 3E, 3F, 3G, and 3H show an example in accordance with one or more embodiments of the invention.
Figure 3C:
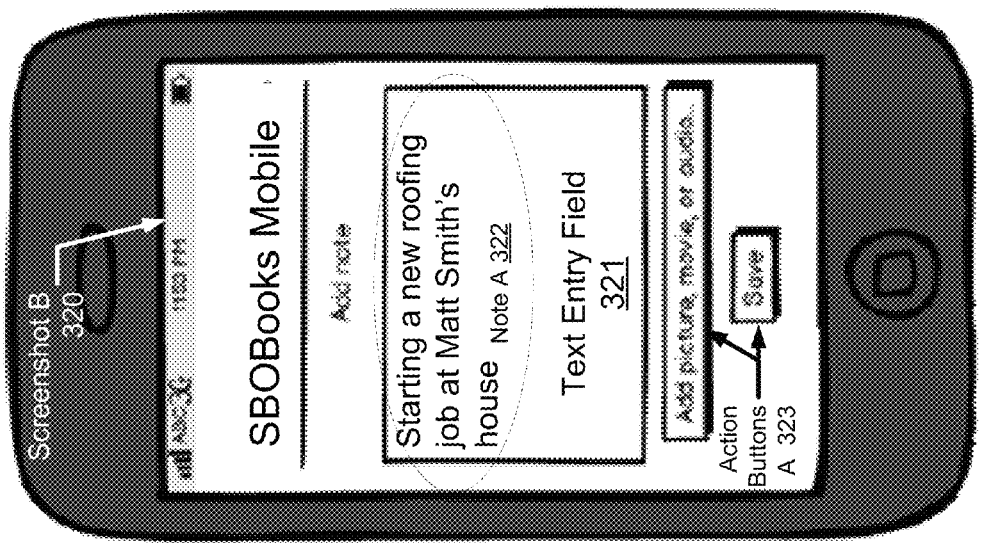

FIG. 3A shows an example automated invoicing system (300) used by a service provider (305) to send an invoice to his/her customer (306). As shown in FIG. 3A, the service provider (305) uses the small business owner (SBO) mobile front-end application (301) to access the SBO mobile back-end server (302) that automatically generates and sends the invoice to the customer (306). For example, the SBO mobile front-end application (301) may be executing on a mobile device (not shown) of the service provider (305) that accesses the SBO mobile back-end server (302) via the Internet.

Further as shown in FIG. 3A, two main systems execute on the SBO mobile back-end server (302). Specifically, the first system is the Data Processor System (DPS) (303) that parses raw text notes and pictures into usable accounting data. The DPS (303) may correspond to the job data collector (161) and the job data analyzer (162) depicted in FIG. 1 above. For example, the DPS (303) may handle natural language processing of SBO generated text notes and text scraping from SBO provided images, such as receipts. Once the raw notes and images are processed, the DPS (303) maps and groups the parsed data into basic accounting data entities, such as customers, expenses, time worked, and the person who did the work, etc. The loosely grouped items will be aggregated into larger data entities, such as complete data input for an invoice.

The second system is the Automated Invoicing System (AIS) (304) that analyzes the grouped items created by the DPS (303) to create invoices. The AIS (304) may correspond to the service provider invoice generator (163) depicted in FIG. 1 above. For example, the AIS (304) may group items that were created at the same location using GPS/location data. If the customer at this same location is not readily identified, the AIS (304) may look up the customer based on the address of this location. In addition, the AIS (304) may identify the type of the job being done and which worker is doing it based on the grouped items to determine the applicable labor rate. Further, the AIS (304) may aggregate material and labor expenses together for the job at this location. Based on the expenses, the AIS (304) attempts to match them up to a pre-determined service item. For example, the service provider (305) may purchase shingles of which the associated expenses may map to the service item "roofing." Further still, the AIS (304) may look at timestamps and other details of the text notes to determine how many hours were spent at the job. Accordingly, all this information may be aggregated together to create invoices.

The second functionality of the AIS (304) is to make invoice suggestions for the service provider (305). The invoices that the AIS creates are presented in the SBO mobile front-end application (301) as suggestions to the service provider (305). Within the SBO mobile front-end application (301), the service provider (305) may approve the suggested invoice as is, or approve the suggested invoice after manual revision. Based on the approval/revision information, the AIS (304) learns how to create the invoice. Based on the SBO revisions, such as adding a discount, adjusting the mapping of a service item, etc., the AIS (304) adapts its algorithm to generate future invoices. With the machine learning over time, the service provider (305) may eventually check a selection box (e.g., labeled as "Automatically Invoice my Customers") in the SBO mobile front-end application (301) to stop creating invoice suggestions, and instead just email automatically created invoices to the customer (306). Furthermore, the AIS (304) may periodically scan and analyze collected data to determine when to generate and email an invoice.

FIGS. 3B, 3C, 3D, 3E, 3F, 3G, and 3H show example screenshots of the SBO mobile front-end application (301) (referred to as "SBOBooks Mobile") captured from a smartphone used by the service provider (305), who is "Bob" the roofer. In the example described below in reference to FIGS. 3B, 3C, 3D, 3E, 3F, 3G, and 3H, Bob has been hired to do some roof repairs at Matt Smith's (i.e., the customer (306)) house.

Figure 3B:
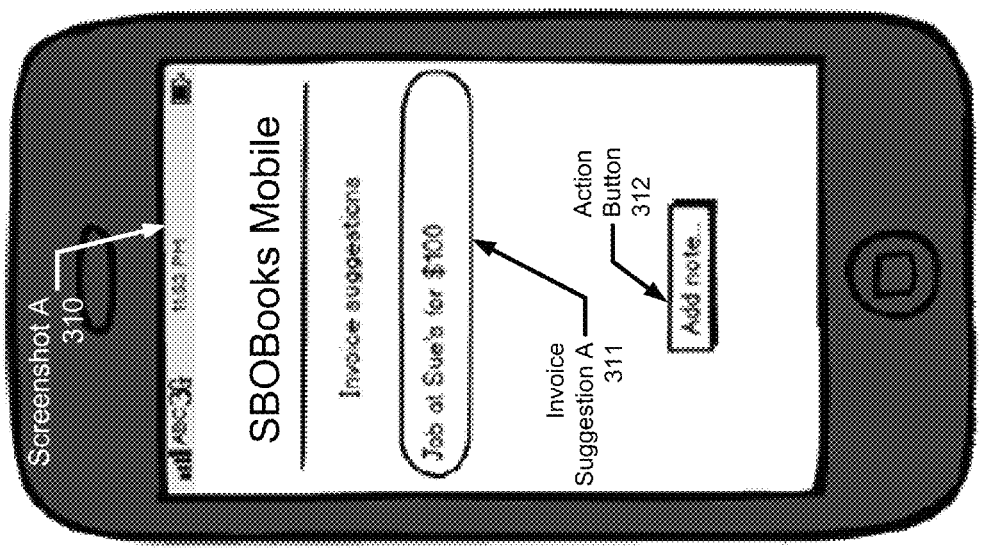
Figure 3E:
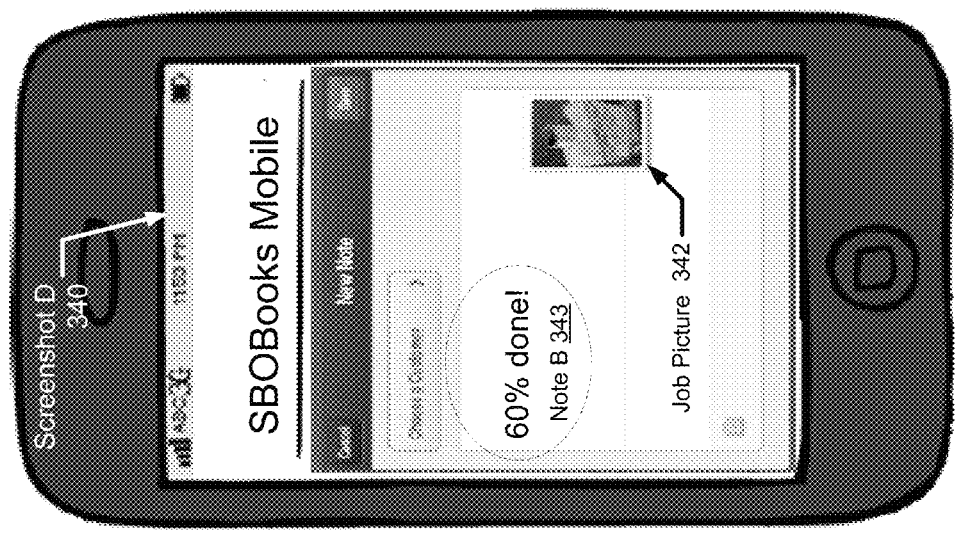

FIG. 3B shows the screenshot A (310) that Bob sees on his first day of repairing Matt Smith's roof. In particular, the screenshot A (310) includes an invoice suggestion A (311) regarding a job that Bob has been working on for another customer "Sue," as well as an action button (312) allowing Bob to add notes. Bob decides to deal with the invoice suggestion A (311) later but starts to enter a note regarding his new roofing job for Matt.

FIG. 3C shows the screenshot B (320) that includes a text entry field (321) where Bob enters the note A (322) that says, "Starting a new roofing job at Matt Smith's house." In addition, the screenshot B (320) also includes the action buttons A (323) that allow Bob to save the entered note A (322) and/or to add picture, movie, or audio notes. Bob decides to save the note A (322) and proceeds to take a picture of a receipt showing that he purchased various materials to be used for Matt's roof repair.

Figure 3D:
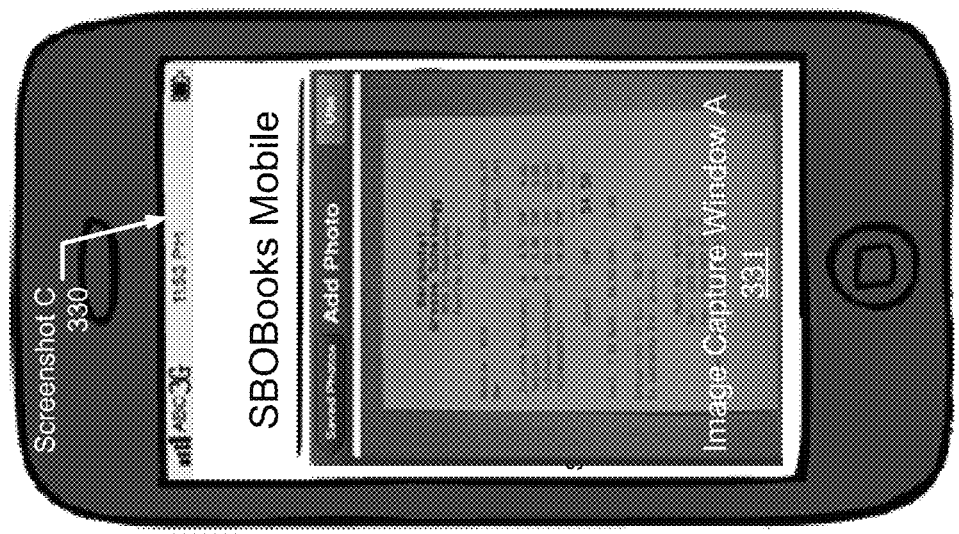

FIG. 3D shows the screenshot C (330) that includes an image capture window A (331). As shown in FIG. 3D, Bob uses the smart phone and the SBOBooks Mobile to snap a picture of the invoice that is displayed in the image capture window A (331). During each following day of the roof repairing job, Bob fills in more notes, possibly with pictures, sound clips, or even movies.

FIG. 3E shows the screenshot D (340) that includes the note B (343) entered by Bob to say "60% done!" and the job picture (342) snapped by Bob to show a partially patched chimney on Matt's roof. The agreement between Bob and Matt includes a progress payment clause that requires Matt to pay a partial payment when the roof repair is at least half done.

Behind the scenes, the AIS (304) described in FIG. 3A analyzes all of Bob's notes and information for the roof repair job. Looking at the details of Bob's notes as well as GPS information of where the notes were entered, it determines that Bob did 7 hours of service item "Roofing Repairs" at 1234 Main St. Sunnyvale, Calif. It knows that this address corresponds to the customer Matt Smith and that the Roofing Repairs activity corresponds to a service item in SBOBooks Mobile that has a billing rate of $50/hour for Bob. Further, the AIS (304) detects from the note B (343) that more than 50% of the roof repair is now done and an invoice needs to be sent to Matt for the progress payment. With this information the AIS (304) creates an invoice for Bob as a "suggestion" for the work he partially completed.

Figure 3G:
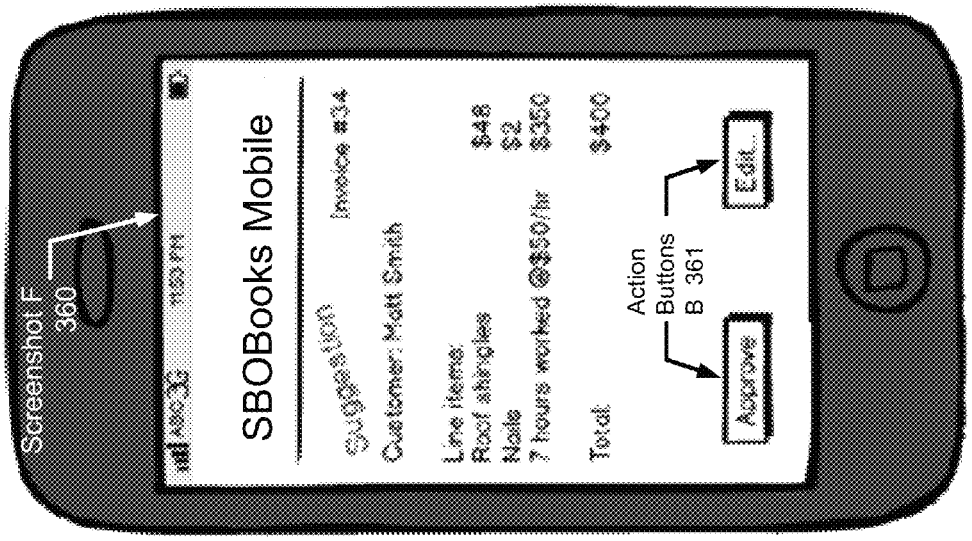
Figure 3F:
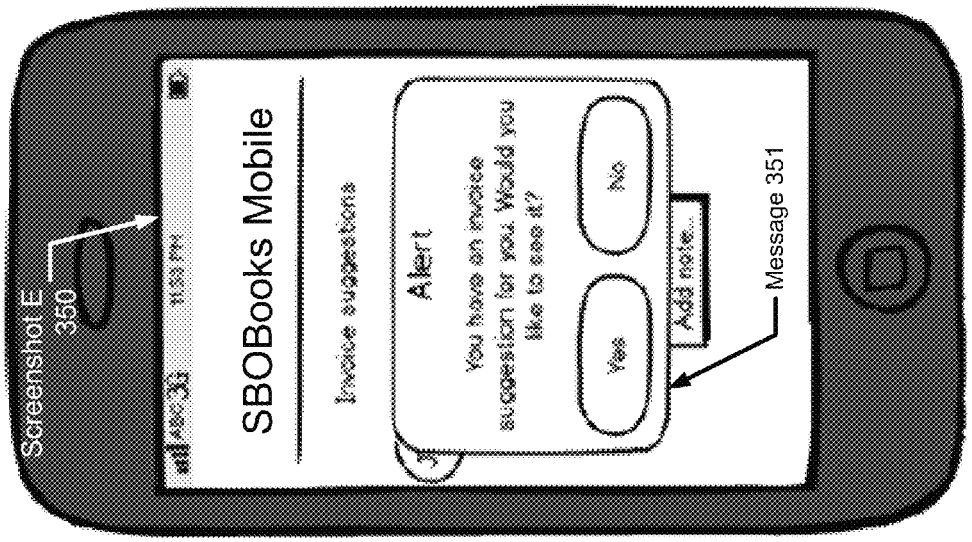
Figure 3H:
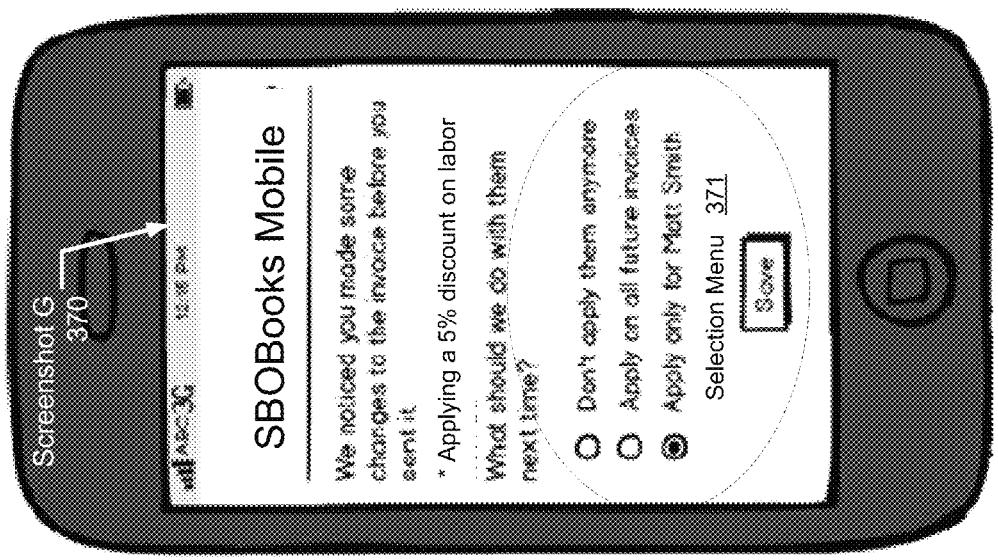

FIG. 3F shows the screenshot E (350) that includes a message (351) alerting Bob that an invoice suggestion is ready for Bob's review. Once Bob clicks "yes" embedded in the message (351) to review the invoice suggestion, screenshot F (360) is displayed as shown in FIG. 3G. Specifically, the screenshot F (360) includes details of the suggested invoice showing $48 for purchasing roof shingles, $2 for purchasing nails, and $350 for 7 hours' worth of labor. In particular, these time and material expense amounts are extracted from the aforementioned GPS data and the invoice shown in FIG. 3D above. In addition, the screenshot F (360) also includes action buttons B (361) that allows Bob to approve the suggested invoice or to edit the suggested invoice before approving it.

Bob chooses to edit this invoice by adding some additional things such as a 5% discount (since Matt is his friend) on the labor expense and then approves this revised invoice. Bob emails the invoice to Matt and is paid in the usual way. The AIS (304) makes a note behind the scene for next invoice regarding the 5% labor discount for Matt. The AIS just learned something (i.e., the discount) to create invoices more accurately for Bob. FIG. 3H shows the screenshot G (370) that includes a selection menu (371) where Bob indicates that the 5% labor expense discount is to be applied to Matt Smith only. This selection is used by the AIS (304) to adjust the invoice generation algorithm for Bob's job whenever Matt is the customer.

Bob does a few more jobs like this and realizes that the invoice suggestions provided by SBOBooks Mobile are very accurate. Bob goes into SBOBooks Mobile and turns on a setting that says, "Automatically invoice my customers." On the last day and on the roof of the next job Bob does for another customer Mary, he enters a note into SBOBooks Mobile that says, "Finished the job at Mary's house." The AIS (304) picks this up, creates the invoice automatically, and emails it to Mary by the time Bob has finished climbing down the ladder.

Figure 4:
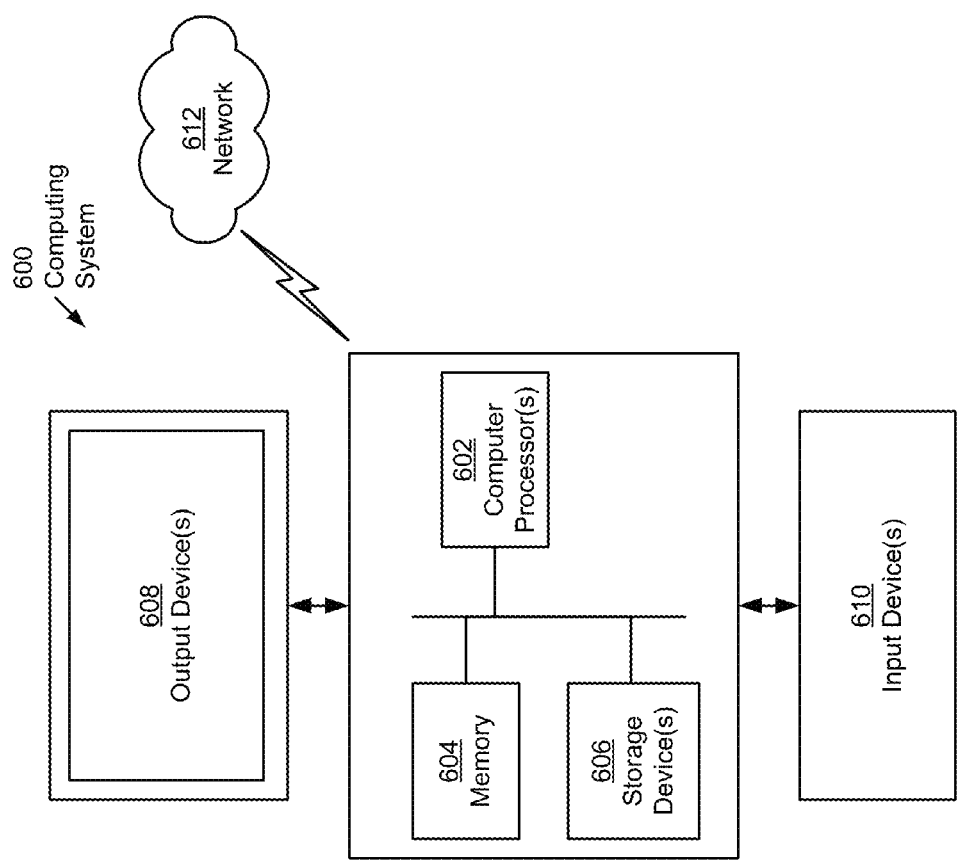
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a service provider invoice, comprising:
    obtaining a plurality of documents from a plurality of sources via a mobile device of a service provider, wherein the plurality of documents are generated for a plurality of customer jobs performed by the service provider at a plurality of jobsites, and wherein one of the documents comprises an image captured by the mobile device;
    analyzing, by a computer processor and based on a pre-determined criterion, the plurality of documents to identify a subset of the plurality of documents corresponding to a jobsite of the plurality of jobsites, wherein analyzing the plurality of documents comprises:
        retrieving a plurality of global positioning service (GPS) data items associated with the plurality of documents; and
        determining, based on the plurality of GPS data items, that the subset of the plurality of documents is related to the jobsite;
    extracting, by the computer processor, job data from the subset of the plurality of documents, wherein the job data comprises time and material information associated with a customer job of the plurality of customer jobs that is performed at the jobsite; and
    generating the service provider invoice, using the job data, by:
        identifying, using one or more of the plurality of GPS data items, an address for a location of the jobsite,
        identifying a customer at the address,
        inserting an identifier of the customer into the service provider invoice,
        identifying, using the material information extracted from the subset of the plurality of documents, a type of the customer job,
        determining, based on the type of the customer job, a labor rate of the service provider for the customer job, and
        inserting the labor rate into the service provider invoice.

2. The method of claim 1, further comprising:
    displaying the service provider invoice on the mobile device.

3. The method of claim 1, further comprising:
    generating, prior to generating the service provider invoice and based on the pre-determined criterion, a second service provider invoice associated with previous work by the service provider for the customer;
receiving, in response to the service provider reviewing the second service provider invoice, a first service provider correction to the second service provider invoice, wherein the second service provider invoice is revised based on the first service provider correction for approval by the service provider; and
adjusting, based on the first service provider correction, the pre-determined criterion to generate a determined criterion,
wherein generating the service provider invoice is based on the determined criterion.

4. The method of claim 3, further comprising:
receiving, in response to the service provider reviewing the service provider invoice, a second service provider correction to the service provider invoice, wherein the service provider invoice is revised based on the second service provider correction for approval by the service provider; and
adjusting, based on the second service provider correction, the determined criterion to generate a further determined criterion, wherein the further determined criterion is used to generate a future service provider invoice associated with future work by the service provider for the customer.

5. The method of claim 1,
wherein obtaining the plurality of documents comprises:
receiving a text note generated by the service provider, wherein the text note comprises project description related to the jobsite, and
receiving a request from the service provider to obtain an image of a receipt, wherein the receipt identifies an expense amount for purchasing an item by the service provider,
wherein analyzing the plurality of documents comprises:
analyzing extracted information from the image of the receipt and the project description from the text note to determine that the item is purchased for the jobsite,
wherein extracting the job data comprises:
extracting the expense amount from the image of the receipt, and
wherein the service provider invoice comprises an invoice amount based at least on the expense amount.

6. The method of claim 5, further comprising:
determining a time amount of the service provider working for the customer based at least on a timestamp of the text note, wherein the timestamp identifies when the text note is generated by the service provider; and
calculating a labor cost based on the time amount and the labor rate of the service provider,
wherein extracting the job data further comprises retrieving the timestamp from the text note, and
wherein the invoice amount is further based on the labor cost.

7. The method of claim 5, further comprising:
analyzing the image to identify an item description of the item; and
identifying a match by comparing the type of the customer job and the item description of the item based on a pre-determined jobsite material list,
wherein determining that the item is purchased for the jobsite is based on the match.

8. The method of claim 5, further comprising:
retrieving a timestamp of the text note to identify when the text note is generated by the service provider;
analyzing the image to extract a purchase date when the item is purchased by the service provider; and
identifying a match by comparing the purchase date and the timestamp based on a pre-determined time range,
wherein determining that the item is purchased for the jobsite is based on the match.

9. A system for generating a service provider invoice, comprising:
a mobile device used by a service provider, the mobile device comprising:
a global positioning service (GPS) device configured to obtain a geographic location of the mobile device;
at least one computer processor;
memory storing instructions executable by the at least one computer processor, wherein the instructions comprise functionality for:
a job data collector configured to:
obtain a plurality of documents from a plurality of sources via the mobile device, wherein the plurality of documents are generated for a plurality of customer jobs performed by the service provider at a plurality of jobsites, and wherein one of the documents comprises an image captured by the mobile device;
a job data analyzer configured to:
analyze, based on a pre-determined criterion, the plurality of documents to identify a subset of the plurality of documents corresponding to a jobsite of the plurality of jobsites, wherein analyzing the plurality of documents comprises:
retrieving a plurality of GPS data items associated with the plurality of documents; and
determining, based on the plurality of GPS data items, that the subset of the plurality of documents is related to the jobsite; and
extract job data from the subset of the plurality of documents, wherein the job data comprises time and material information associated with a customer job of the plurality of customer jobs that is performed at the jobsite; and
a service provider invoice generator configured to:
generate the service provider invoice, using the job data, by:
identifying, using one or more of the plurality of GPS data items, an address for a location of the jobsite,
identifying a customer at the address,
inserting an identifier of the customer into the service provider invoice,
identifying, using the material information extracted from the subset of the plurality of documents, a type of the customer job,
determining, based on the type of the customer job, a labor rate of the service provider for the customer job, and
inserting the labor rate into the service provider invoice; and
a repository for storing the plurality of documents, the job data, and the service provider invoice.

10. The system of claim 9, wherein the mobile device comprises the computer processor and the memory.

11. The system of claim 9,
wherein obtaining the plurality of documents comprises:
receiving a text note generated by the service provider, wherein the text note comprises project description related to the jobsite; and receiving a request from the service provider to obtain an image of a receipt, wherein the receipt identifies an expense amount for purchasing an item by the service provider, wherein analyzing the plurality of documents comprises:
analyzing extracted information from the image of the receipt and the project description from the text note to determine that the item is purchased for the jobsite, wherein extracting the job data comprises:
extracting the expense amount from the image of the receipt, and wherein the service provider invoice comprises an invoice amount based at least on the expense amount.

12. The system of claim 11, wherein the service provider invoice generator is further configured to:
determine a time amount of the service provider working for the customer based at least on a timestamp of the text note, wherein the timestamp identifies when the text note is generated by the service provider; and
calculate a labor cost based on the time amount and the labor rate of the service provider,
wherein extracting the job data further comprises retrieving the timestamp from the text note, and
wherein the invoice amount is further based on the labor cost.

13. The system of claim 11, wherein the job data analyzer is further configured to:
analyze the image to identify an item description of the item; and
identify a match by comparing the type of the customer job and the item description of the item based on a pre-determined jobsite material list,
wherein determining that the item is purchased for the jobsite is based on the match.

14. The system of claim 11, wherein the job data analyzer is further configured to:
retrieve a timestamp of the text note to identify when the text note is generated by the service provider;
analyze the image to extract a purchase date when the item is purchased by the service provider; and
identify a match by comparing the purchase date and the timestamp based on a pre-determined time range,
wherein determining that the item is purchased for the jobsite is based on the match.

15. A non-transitory computer readable storage medium comprising software instructions for generating a service provider invoice, that when executed, comprises functionality for:
obtaining a plurality of documents from a plurality of sources via a mobile device of a service provider, wherein the plurality of documents are generated for a plurality of customer jobs performed by the service provider at a plurality of jobsites, and wherein one of the documents comprises an image captured by the mobile device;
analyzing, based on a pre-determined criterion, the plurality of documents to identify a subset of the plurality of documents corresponding to a jobsite of the plurality of jobsites, wherein analyzing the plurality of documents comprises:
retrieving a plurality of global positioning service (GPS) data items associated with the plurality of documents; and
determining, based on the plurality of GPS data items, that the subset of the plurality of documents is related to the jobsite;
extracting job data from the subset of the plurality of documents, wherein the job data comprises time and material information associated with a customer job of the plurality of customer jobs that is performed at the jobsite; and
generating the service provider invoice, using the job data, by:
identifying, using one or more of the plurality of GPS data items, an address for a location of the jobsite,
identifying a customer at the address,
inserting an identifier of the customer into the service provider invoice, identifying, using the material information extracted from the subset of the plurality of documents, a type of the customer job,
determining, based on the type of the customer job, a labor rate of the service provider for the customer job, and
inserting the labor rate into the service provider invoice.

* * * * *